(12) United States Patent
Vrubel et al.

(10) Patent No.: US 12,506,589 B1
(45) Date of Patent: Dec. 23, 2025

(54) SYSTEM AND METHOD FOR SECURE KNOWLEDGE DISTILLATION USING HOMOMORPHIC ENCRYPTION IN MACHINE LEARNING ENVIRONMENTS

(71) Applicant: Chain Reaction, Ltd., Tel Aviv (IL)

(72) Inventors: Oren Vrubel, Tel Aviv (IL); Nimrod Borer, Atlit (IL)

(73) Assignee: Chain Reaction, Ltd., Tel Aviv (IL)

( * ) Notice: Subject to any disclaimer, the term of this patent is extended or adjusted under 35 U.S.C. 154(b) by 0 days.

(21) Appl. No.: 19/080,000

(22) Filed: Mar. 14, 2025

(51) Int. Cl.
*H04L 9/00* (2022.01)
*G06F 16/23* (2019.01)
*G06F 21/62* (2013.01)

(52) U.S. Cl.
CPC .......... H04L 9/008 (2013.01); G06F 16/2372 (2019.01); G06F 21/6227 (2013.01)

(58) Field of Classification Search
CPC ... H04L 9/008; G06F 16/2372; G06F 21/6227
See application file for complete search history.

(56) References Cited

U.S. PATENT DOCUMENTS

| | | | | |
|---|---|---|---|---|
| 2011/0144973 A1* | 6/2011 | Bocchieri | .............. | G06F 40/58 704/E15.005 |
| 2020/0358611 A1* | 11/2020 | Hoang | .................. | H04L 9/3231 |
| 2021/0397988 A1* | 12/2021 | Sarpatwar | ................ | G06N 3/04 |
| 2023/0259716 A1* | 8/2023 | Merler | .................... | G06F 40/30 704/9 |
| 2024/0126634 A1* | 4/2024 | Ni | ......................... | G06F 11/079 |
| 2024/0126997 A1* | 4/2024 | Bent, III | ............ | G06Q 30/0276 |

(Continued)

FOREIGN PATENT DOCUMENTS

CN 119807261 A * 4/2025 ............. G06F 16/25

OTHER PUBLICATIONS

"CryptoLab and Niobium Partner to Bring Guaranteed Privacy to LLM and Generative AI Applications", PR Newswire, Oct. 10, 2024, Seoul, South Korea and Dayton, Ohio, published online: https://www.prnewswire.com/news-releases/cryptolab-and-niobium-partner-to-bring-guaranteed-privacy-to-llm-and-generative-ai-applications-302273035.html, dated accessed Feb. 12, 2025.

(Continued)

*Primary Examiner* — Meng Li
(74) *Attorney, Agent, or Firm* — M&B IP Analysts, LLC (57) ABSTRACT

A method for secure knowledge transfer between machine learning models is provided. The method includes receiving a query within a secure environment, determining whether a local language model within the secure environment is capable of processing the query based on one or more criteria, and generating a response using the local language model when the local language model is determined to be capable of processing the query. An external processing request is generated when the local language model is determined to be not capable of processing the query and the external processing request is encrypted using homomorphic encryption. The encrypted external processing request is transmitted to an external environment and an encrypted response from the external environment is received. The encrypted response is decrypted and knowledge distillation is performed on the decrypted response to extract knowledge patterns; and the local language model is updated using the extracted knowledge patterns.

23 Claims, 5 Drawing Sheets

(56) References Cited

U.S. PATENT DOCUMENTS

| | | |
|---|---|---|
| 2024/0242039 A1* | 7/2024 | Gao ............... G06F 40/40 |
| 2024/0320348 A1* | 9/2024 | Williams ............... G06F 9/5027 |
| 2024/0320421 A1* | 9/2024 | Bursztyn ............... G06F 40/56 |
| 2025/0068924 A1* | 2/2025 | M'hamdi ............... G06F 40/30 |
| 2025/0086205 A1* | 3/2025 | Vasseur ............... G06F 16/3329 |
| 2025/0094827 A1* | 3/2025 | Awadallah ............... G06N 5/02 |
| 2025/0124350 A1* | 4/2025 | Ma ............... G06F 16/24573 |
| 2025/0131122 A1* | 4/2025 | Song ............... G06F 21/6245 |

OTHER PUBLICATIONS

"FHE Use-Cases and Benchmarking", 7th HE Standardization Workshop, Oct. 13, 2024, Salt-Lake City, UT, USA, https://homomorphicencryption.org/wp-content/uploads/2024/10/Benchmarking.pdf, date accessed Feb. 12, 2025.

Rho, Donghwan, et al. "Encryption-Friendly LLM Architecture", Seoul National University, Department of Mathematical Sciences, CryptoLab Inc, and UCLA, Department of Mathematics, Oct. 3, 2024, pp. 1-27, https://arxiv.org/pdf/2410.02486, date accessed Feb. 12, 2025.

Soceanu, O., Zimerman, I., Adir, A., Aharoni, E., Avitan, M., Baruch, M., Drucker, N., Lerner, J., Masalha, R., & Meiri, R. (Oct. 12, 2024). Power-softmax: Towards secure LLM inference over Encrypted Data. arXiv. https://arxiv.org/html/2410.09457v1.

\* cited by examiner

SYSTEM AND METHOD FOR SECURE KNOWLEDGE DISTILLATION USING HOMOMORPHIC ENCRYPTION IN MACHINE LEARNING ENVIRONMENTS

TECHNICAL FIELD

The present disclosure relates generally to privacy-enhanced machine learning systems and, more specifically, to systems and methods for secure knowledge distillation using homomorphic encryption in machine learning environments.

BACKGROUND

Machine learning models, particularly Large Language Models (LLMs), are increasingly being deployed in cloud environments to leverage their computational capabilities. While cloud deployment offers significant advantages, it also introduces privacy challenges that impact regulatory compliance, business confidentiality, and personal privacy. The risks are twofold: queries are exposed during processing and may be compromised despite security measures, and data within these queries may be assimilated into the LLM model, creating the potential for unintended data exposure to other users or applications.

Several approaches have evolved to address these privacy concerns. These include pre-processing techniques such as data minimization and anonymization, implementation of additional security layers through confidential computing in cloud environments, and on-premises installations that maintain private data within trusted zones. A recent development involves hybrid models that combine a lightweight local model, installed on premises or on a local device, with a more comprehensive model in the cloud. This approach enables the local model to handle queries when possible, maximizing privacy and minimizing latency, while leveraging the cloud model's capabilities when necessary. Such hybrid models can implement model distillation, transferring knowledge from a larger model to a smaller one, to enhance the capabilities of local models through either dedicated training sessions or ongoing usage. However, the communication between local and cloud models during this process remains vulnerable to privacy concerns, particularly during knowledge transfer operations.

One potential approach to securing such communications is homomorphic encryption (HE). Traditional encryption protects data at rest and in transit but falls short during data processing. HE addresses this limitation by enabling computation on encrypted data, allowing secure processing without exposing the underlying information. However, the substantial computational demands of HE have limited its practical application in real-time cloud-based AI systems.

Therefore, it would be advantageous to provide a solution that overcomes the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, the method may include determining whether a local language model within the secure environment is capable of processing an input query based on one or more criteria. The method may also include generating a response using the local language model when the local language model is determined to be capable of processing the query. The method may furthermore include generating an external processing request when the local language model is determined to be incapable of processing the query. The method may, in addition include encrypting the external processing request using a homomorphic encryption; transmitting the encrypted external processing request to an external environment; receiving an encrypted response from the external environment; decrypting the encrypted response within the secure environment; performing knowledge distillation on the decrypted response to extract knowledge patterns; and updating the local language model using the extracted knowledge patterns. Other embodiments of this aspect include corresponding computer systems, apparatus, and computer programs recorded on one or more computer storage devices, each configured to perform the actions of the methods.

Implementations may include one or more of the following features. The method may include: generating training data for the local language model based on the extracted knowledge patterns. The method where updating the local language model further may include: incorporating the distilled knowledge into the local language model's parameters; and validating the local language model's performance. The method where the one or more criteria includes at least one of the local language model's knowledge base, training parameters, and domain-specific capabilities. The method where the knowledge distillation may include extracting at least one of: chain-of-thought reasoning patterns, response templates, domain-specific knowledge, optimization parameters, and model weights. The method where the external processing request includes at least one of an immediate query processing request, a domain knowledge request, a training data request, an optimization parameter request, and validation data request. The method may include receiving processing results from a local inference module; implementing optimization algorithms to enhance model performance of the local language model; and maintaining efficiency parameters of the local language model based on the received processing results. The method may further include augmenting the query with information from a private database within the secure environment using a retrieval augmented generation (RAG) module to generate an enhanced query; and processing the enhanced query using the local language model. The method where the homomorphic encryption may include at least one of: partially homomorphic encryption (PHE); somewhat homomorphic encryption (SHE); and fully homomorphic encryption (FHE). The method may also include optimizing cloud computing resources by: performing offline distillation; and minimizing data transmitted from the secure environment to the external environment over time. The method may include maintaining a security boundary between the secure environment and the external environment; and ensuring data crossing the security boundary is encrypted using homomorphic encryption. The method where the external processing request is processed using a hardware accelerator optimized for homomorphic encryption operations. The method may include performing offline knowledge distillation during system initialization; and configuring the local language model based on the offline knowledge distillation. Implementations of the described techniques may include hardware, a method or process, or a computer tangible medium.

In one general aspect, the system may include one or more processors configured to: receive a query within a secure environment; determine whether a local language model within the secure environment is capable of processing the query based on one or more criteria; generate a response using the local language model when the local language model is determined to be capable of processing the query. The system may moreover include generating an external processing request when the local language model is determined to be not capable of processing the query; encrypting the external processing request using homomorphic encryption; transmitting the encrypted external processing request to an external environment; and receiving an encrypted response from the external environment. The system may moreover include decrypting the encrypted response within the secure environment; performing knowledge distillation on the decrypted response to extract knowledge patterns; and updating the local language model using the extracted knowledge patterns. Other embodiments of this aspect include corresponding computer systems, apparatus, and computer programs recorded on one or more computer storage devices, each configured to perform the actions of the methods.

Implementations may include one or more of the following features. The system may include: a homomorphic encryption accelerator configured to perform encryption operations; and where the homomorphic encryption accelerator may include dedicated processing circuitry optimized for homomorphic encryption calculations. The system where the external environment may include: a private inference module configured to process encrypted requests; an external language model configured to generate responses; and training data accessible to the external language model. The system may include: a retrieval augmented generation (RAG) module configured to enhance queries with information from a private database. Implementations of the described techniques may include hardware, a method or process, or a computer tangible medium.

In one general aspect, non-transitory computer-readable medium may include one or more instructions that, when executed by one or more processors of a device, cause the device to: receive a query within a secure environment determine whether a local language model within the secure environment is capable of processing the query based on one or more criteria; generate a response using the local language model when the local language model is determined to be capable of processing the query; generate an external processing request when the local language model is determined to be not capable of processing the query; encrypt the external processing request using homomorphic encryption; transmit the encrypted external processing request to an external environment; receive an encrypted response from the external environment; decrypt the encrypted response within the secure environment; perform knowledge distillation on the decrypted response to extract knowledge patterns; and update the local language model using the extracted knowledge patterns. Other embodiments of this aspect include corresponding computer systems, apparatus, and computer programs recorded on one or more computer storage devices, each configured to perform the actions of the methods.

Implementations may include one or more of the following features. Non-transitory computer-readable medium where the one or more instructions further cause the device to: enrich the query with data from a cloud-based database using a retrieval augmented generation (RAG) mechanism; and process the enriched query while maintaining the data in an encrypted state. Non-transitory computer-readable medium where the one or more instructions further cause the device to: process the encrypted request during a real-time inference operation; and perform knowledge distillation during an offline training session. Non-transitory computer-readable medium where processing the decrypted response may include extracting domain-specific knowledge from the external environment; and customizing the local language model using the extracted domain-specific knowledge. Non-transitory computer-readable medium where the one or more instructions further cause the device to: initialize the local language model with initial distillation learning parameters; and update the distillation parameters local language model using continues distillation during regular operational use. Non-transitory computer-readable medium where processing the decrypted response may include extracting one or more chain-of-thought reasoning patterns to enhance training of the local language model.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

In the drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be plural and vice versa with no loss of generality. In the drawings, like numerals refer to like parts through several views.

As used herein, the term "local language model" refers to a machine learning model deployed within a secure environment that is configured to process queries and generate responses. The local language model may be implemented as a lightweight version optimized for specific tasks or domains, enabling efficient processing while maintaining reduced computational requirements compared to larger models.

As used herein, the term "knowledge distillation" refers to a process of transferring knowledge from one machine learning model to another. This process includes extracting patterns, parameters, and insights from a source model's responses and incorporating them into a target model to enhance its capabilities, enabling the target model to learn and improve its performance through the transferred knowledge.

As used herein, the term "secure environment" refers to a protected computational zone with defined security boundaries. The secure environment ensures that data within it is protected from unauthorized access or modification and requires all data leaving the environment to be encrypted, thereby maintaining data privacy and security throughout processing operations.

As used herein, the term "external environment" refers to a computational environment outside the secure environment, typically including cloud-based resources. The external environment may interact with the secure environment exclusively through encrypted communications, maintaining data privacy while enabling access to enhanced processing capabilities.

As used herein, the term "homomorphic encryption" refers to a form of encryption that allows computations to be performed on encrypted data without first decrypting it. This encryption scheme ensures that the results of operations performed on encrypted data, when decrypted, match the results of the same operations performed on unencrypted data, enabling secure processing while maintaining data privacy.

As used herein, the term "chain-of-thought reasoning patterns" refers to step-by-step logical processes used by a language model to arrive at responses. These patterns may include intermediate reasoning steps and decision pathways that can be extracted during knowledge distillation to enhance the training of other models.

As used herein, the term "retrieval augmented generation (RAG)" refers to a mechanism for enhancing queries with relevant information from a database before processing. The RAG mechanism enriches queries with contextual information from private or external databases, enabling more accurate and contextually relevant responses while maintaining data security.

As used herein, the term "processing capabilities" refers to a language model's ability to handle specific types of queries based on its current knowledge, training parameters, and operational constraints. These capabilities may be evaluated using predetermined criteria to determine whether the model can process a given query locally or requires external processing assistance.

As used herein, the term "knowledge transfer" refers to the process of moving information, patterns, and learned capabilities from one model to another while maintaining security and privacy requirements. This process may occur through direct distillation or through encrypted channels when transferring knowledge between secure and external environments.

As used herein, the term "enhanced query" refers to a query that has been augmented with additional context or information from a database. Enhanced queries may incorporate relevant contextual data to improve response accuracy and relevance while maintaining the security requirements of the source data.

As used herein, the term "private inference module" refers to a component configured to process encrypted requests in an external environment while maintaining the encrypted state of the data. This module may coordinate processing between encrypted requests and external language models without accessing the underlying plaintext information.

As used herein, the term "offline training session" refers to a knowledge transfer process that occurs outside of real-time query processing operations. This process may involve batch processing of knowledge transfer operations between models to optimize resource utilization and minimize real-time computational demands.

As used herein, the term "efficiency parameters" refers to operational metrics and settings that govern the local language model's performance and resource utilization. These parameters may be maintained and adjusted based on processing results to optimize the model's operation within the secure environment.

As used in this disclosure, the terms 'component,' 'module,' 'system,' 'interface,' and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components. In the context of the present disclosure, the information processing and response generation system and its constituent parts may be implemented as hardware, software, or a combination thereof.

Furthermore, the claimed subject matter may be implemented as a method, apparatus, or article of manufacture using standard programming and/or engineering techniques to produce software, firmware, hardware, or any combination thereof to control a computer to implement the disclosed subject matter. For instance, the claimed subject matter may be implemented as a computer-readable medium embedded with a computer-executable program, which encompasses a computer program accessible from any computer-readable storage device or storage media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

The present disclosure aims to provide a computing system configured to facilitate the execution of privacy-enhanced ML programs, with a particular focus on secure knowledge distillation using homomorphic encryption. Specifically, the computing system is designed to implement one or more methods for securely transferring knowledge between machine learning models while maintaining data privacy, minimizing computational overhead, and optimizing resource utilization. The methods and systems described herein enable efficient local processing when possible while leveraging encrypted external processing when needed, thereby providing a hybrid approach that balances privacy requirements with computational capabilities.

Figure 1:
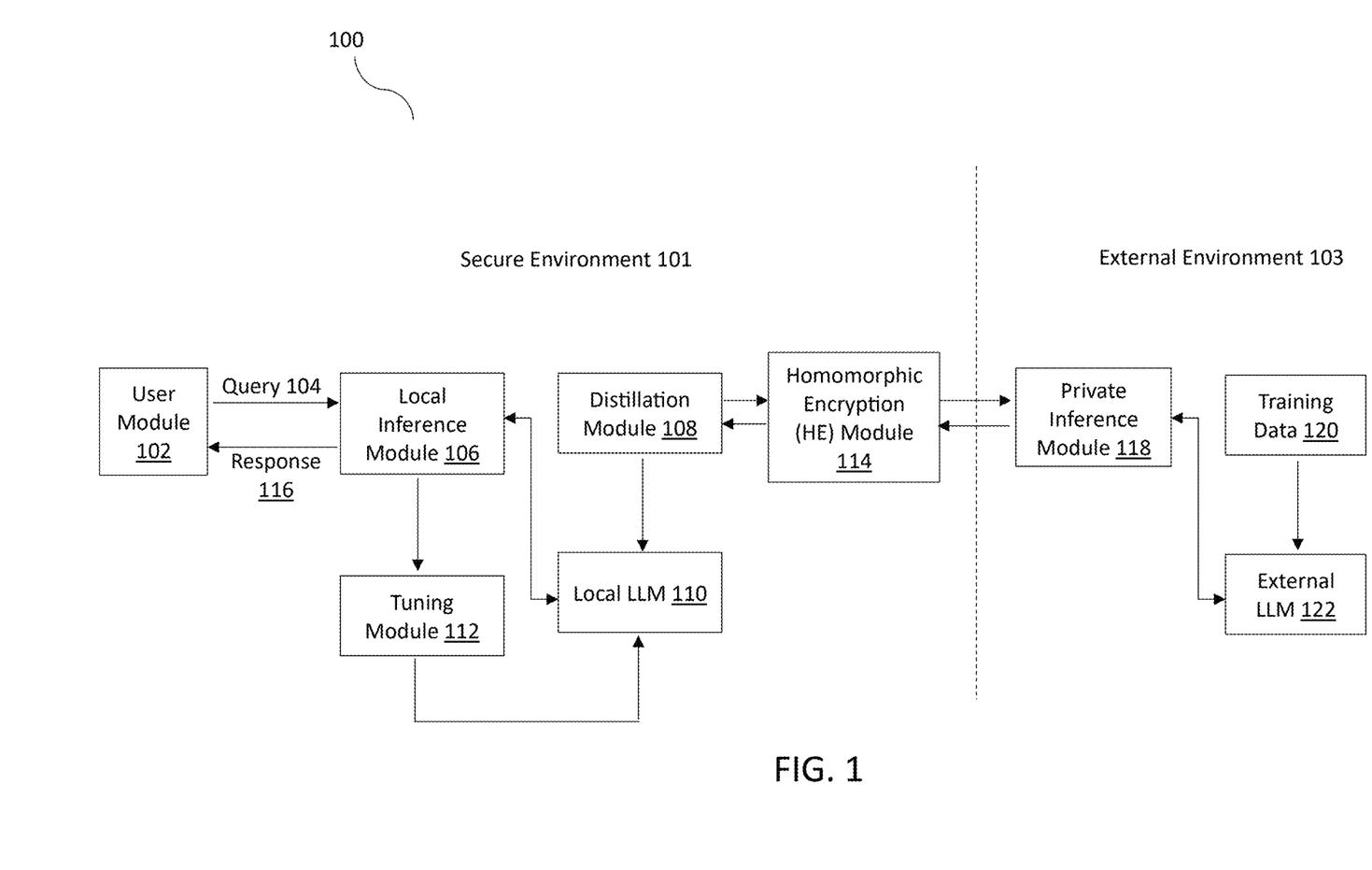
FIG. 1 is a block diagram showing a system architecture for knowledge distillation using homomorphic encryption, in accordance with an embodiment of the present disclosure.

FIG. 1 is a block diagram showing an exemplary system architecture 100 for knowledge distillation using any type of homomorphic encryption, in accordance with an embodiment of the present disclosure. The system architecture 100 may include a secure environment 101 and an external environment 103, which may be separated by at least one security boundary that may be represented by a dotted line in the figure.

The system architecture 100 may support different operational stages throughout its lifecycle. During initial deployment, the secure environment 101 may be established and the local LLM 110 is installed. During a configuration phase, the system 100 may perform initial knowledge distillation operations to set up and customize the local LLM 110 for its intended operational use. During regular operation, the system 100 processes queries either locally or through external processing while prioritizing local processing to minimize external data exposure.

The secure environment 101 may include a user module 102 that is configured to provide an interface for user interactions with the system 100. The user module 102 may be configured to generate queries 104 based on received user input and process responses 116 to such queries. Additionally, the user module 102 is configured to maintain security parameters by operating within the secure environment 101, which ensures the protection of user interactions.

A local inference module 106 is operatively connected to the user module 102 and is configured to receive and process queries 104 generated by the user module 102. The local inference module 106 maintains bidirectional data flow with the local LLM 110, sending queries for processing and receiving inference results. The local inference module 106 is further configured to transmit processing results and performance metrics to the tuning module 112 for optimization. The module 106 analyzes received queries and determines, based on one or more predetermined criteria, whether the queries can be processed by the local LLM 110 within the secure environment 101. When the local LLM 110 can process the queries, the local inference module 106 facilitates local processing and provides responses 116 back to the user module 102 based on the results received from the local LLM 110. When the local LLM 110 cannot process the queries, external processing is initiated via the distillation module 108 and homomorphic encryption, thereby managing computational demands by limiting encrypted processing to necessary external operations.

The local LLM 110 may be provided within the secure environment 101 and is configured to process queries locally. For example, the local LLM 110 may be implemented as a lightweight model optimized for processing domain-specific queries. The local LLM 110 maintains bidirectional communication with the local inference module 106, receiving queries and returning processing results. The local LLM 110 may receive knowledge transfer data from the distillation module 108 for model enhancement and receive optimization updates from the tuning module 112 based on local inference operations.

The secure environment 101 may include a distillation module 108 that is configured to generate external processing requests and perform knowledge distillation on returned data for the local LLM 110. The distillation module 108 supports the system's external processing capabilities when queries cannot be processed by the local LLM 110. The distillation module 108 is configured to maintain a bidirectional connection with the HE module 114 and facilitate knowledge transfer from the external environment 103 to the local LLM 110.

For outbound operations, the distillation module 108 generates external processing requests that are encrypted by the HE module 114 prior to transmission to the external environment 103. These external processing requests may include immediate query processing needs and knowledge-related requests, such as requests for specific domain knowledge, training data, optimization parameters, model enhancement, and/or validation data.

For inbound operations, encrypted data is received and decrypted by the HE module 114, after which the distillation module 108 performs knowledge distillation on the decrypted data. The processed knowledge is then transmitted to the local LLM 110 for model enhancement. For inbound transfers, the distillation module 108 may receive decrypted knowledge transfer data from the HE module 114 and perform knowledge distillation to generate processed knowledge for transmission to the local LLM 110. This processed knowledge may include chain-of-thought reasoning patterns derived from the external LLM 122, response templates that capture optimal response structuring, domain-specific knowledge for model enhancement, optimization parameters, training examples representing proper query handling, model weights and/or parameters derived from the external LLM 122, and validation data from the external environment 103.

The system 100 may further include a tuning module 112 within the secure environment 101 that may be configured to optimize the performance of the local LLM 110. The tuning module 112 receives processing results and performance metrics from the local inference module 106 and provides optimization updates to the local LLM 110. For example, the tuning module 112 may implement one or more optimization algorithms configured to enhance model performance while maintaining model efficiency parameters based on the received local processing metrics.

The homomorphic encryption (HE) module 114 may be provided within the secure environment 101 and maintains bidirectional connections with the distillation module 108 and the private inference module 118. The HE module 114 may be configured to enable secure data transmission between environments using one or more homomorphic encryption schemes. These schemes may include partially homomorphic encryption (PHE) supporting specific mathematical operations, somewhat homomorphic encryption (SHE) supporting a limited number of operations, or fully homomorphic encryption (FHE) supporting an unlimited number of computations on encrypted data.

For outbound operations, the HE module 114 receives data from the distillation module 108, encrypts this data using the selected homomorphic encryption scheme, and transmits the encrypted data to the private inference module 118 in the external environment 103. For inbound operations, the HE module 114 receives encrypted data from the private inference module 118, decrypts this data, and transmits the decrypted data to the distillation module 108. The HE module 114 may establish encryption protocols with the private inference module 118 to enable the processing of computations on the encrypted data.

The private inference module 118 maintains bidirectional communication with the HE module 114 and the external LLM 122. For outbound processing, the private inference module 118 receives encrypted data from the HE module 114 and coordinates with the external LLM 122 to process this data. For inbound operations, the private inference module 118 receives processing results from the external LLM 122 and transmits encrypted data back to the HE module 114. The private inference module 118 operates entirely on encrypted data, enabling computation without access to the underlying plaintext information from the secure environment 101.

External training data 120 includes information to support the processing operations of the external LLM 122. For example, this may include training examples, reference data, optimization parameters, or combinations thereof that enable the external LLM 122 to process requests received through the private inference module 118.

The external LLM 122 is operatively connected to the private inference module 118 and is configured to receive encrypted inference requests from and transmit encrypted inference results to the private inference module 118. The external LLM 122 may utilize the information from the training data 120 to support its processing operations while maintaining the encrypted state of all communications with the private inference module 118.

Figure 2:
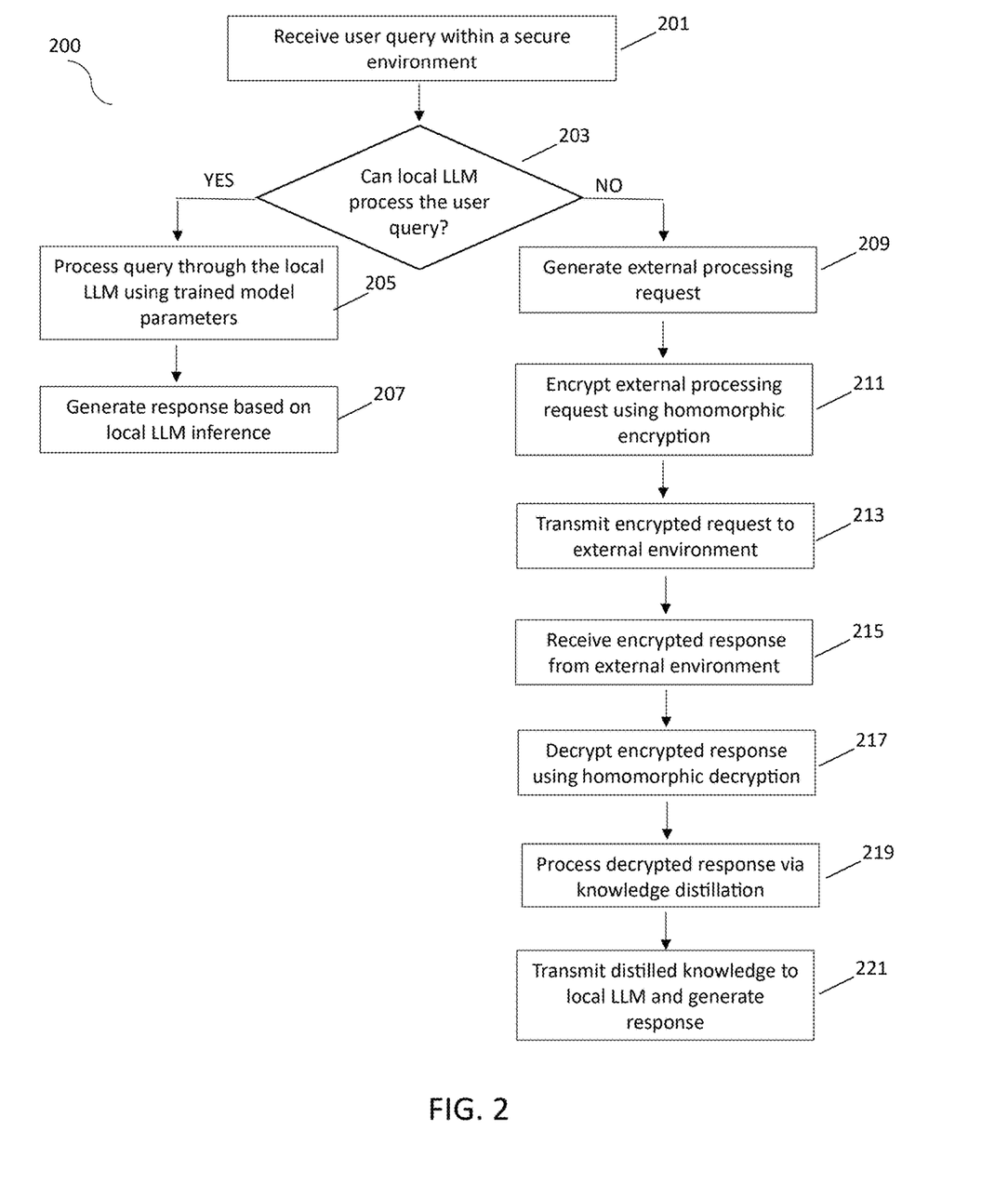
FIG. 2 is a flowchart showing a method implemented by the system of FIG. 1 for knowledge distillation using homomorphic encryption, in accordance with an embodiment of the present disclosure.

FIG. 2 is a flowchart showing a method 200 implemented by the system of FIG. 1 for knowledge distillation using homomorphic encryption, in accordance with an embodiment of the present disclosure. The method 200 illustrates the processing flow for handling user queries in both local and external processing scenarios while maintaining data security through encryption.

The method 200 may support different operational stages of the system. These stages may include: initial deployment where the local LLM is installed in the secure environment; a configuration/initialization phase where initial knowledge distillation processes are performed over homomorphic encryption; and regular operational use where the system handles queries through either local or external processing while continuously improving through distillation.

At 201, a user query within a secure environment is received. For example, the user module 102 within the secure environment 101 receives the query 104, as illustrated in FIG. 1. The query represents a request for processing by the system, which may require either local or external processing depending on its characteristics. The secure environment 101 provides protection of user interactions, ensuring that the initial query handling occurs in a trusted zone.

At 203, it is determined whether a local LLM can process the user query. For example, the local inference module 106 may perform this determination by evaluating whether the query can be processed by the local LLM 110 within the secure environment 101. This determination may be based on predetermined criteria related to the local LLM's processing capabilities, such as the model's current knowledge base, training parameters, or domain-specific capabilities. The determination step enables the system to maximize local processing when possible while identifying cases where external processing may be necessary.

At 205, the query is processed through the local LLM using trained model parameters when the local LLM can process the query (YES at step 203). For example, the local LLM 110 may process the query using its current model parameters, which may be optimized by the tuning module 112. The processing involves utilizing the local model's capabilities within the secure environment 101, leveraging its existing knowledge and training. The trained model parameters may be continuously refined through the tuning module 112's optimization processes, enabling improved local processing capabilities over time.

At 207, a response is generated based on local LLM inference. For example, the local inference module 106 may generate the response 116 based on the processing results from the local LLM 110. The response is then transmitted back to the user module 102. The local inference module 106 may structure the response to match the query's requirements while ensuring all processing remains within the secure boundary. This local processing path provides efficient query handling without the need for encryption or external communication, optimizing system performance for queries that the local LLM can handle.

At 209, an external processing request is generated when the local LLM cannot process the query (NO at step 203). For example, the distillation module 108 generates this request within the secure environment 101. The external processing request may include the original query along with any necessary context or parameters required for external processing. The request may be structured to optimize the subsequent homomorphic encryption process while ensuring all necessary information is included for external processing.

At 211, the external processing request is encrypted using homomorphic encryption. For example, the HE module 114 performs this encryption within the secure environment 101, preparing the request for secure transmission across the security boundary shown in FIG. 1.

In an embodiment, the homomorphic encryption enables computation on the encrypted data without exposing the underlying information, providing a critical security layer for external processing. The homomorphic encryption allows the system to perform computations on encrypted data, enabling the external LLM to process the request without having access to the actual query content. Since processing data over homomorphic encryption is computationally intensive, the system's hybrid architecture helps optimize resource usage by minimizing the data requiring external encrypted processing. This encryption step ensures that even when external processing is required, the original query remains protected throughout its processing lifecycle. The HE module 114's encryption process prepares the data in a format that allows the external environment to perform necessary computations while maintaining data privacy.

At 213, the encrypted request is transmitted to the external environment. In embodiments, the HE module 114 transmits the encrypted request from the secure environment 101 to the private inference module 118 in the external environment 103. This transmission step bridges the secure and external environments while maintaining data protection through encryption. The private inference module 118 receives the encrypted request and manages its processing within the external environment, enabling access to expanded processing capabilities while preserving data confidentiality.

During external processing, after the encrypted request is transmitted at step 213, the external LLM 122 processes the encrypted request while maintaining its encrypted state. For example, the private inference module 118 coordinates with the external LLM 122 to process the encrypted request using training data 120. The external LLM 122 performs computations on the encrypted data without requiring decryption, leveraging the properties of homomorphic encryption to generate meaningful results while preserving data privacy. The processed results are maintained in their encrypted state and prepared for transmission back to the secure environment.

At 215, an encrypted response from the external environment is received. For example, the HE module 114 receives this encrypted response from the private inference module 118, which obtained the response from the external LLM 122 using training data 120. The encrypted response contains the processed results computed by the external LLM while maintaining the homomorphic encryption protection. The response may include processed information and knowledge that can enhance the local LLM's capabilities through subsequent distillation.

At 217, the encrypted response using homomorphic decryption is decrypted. The HE module 114 may perform this decryption within the secure environment 101, enabling secure processing of the external response. This decryption step converts the encrypted response back into a format that can be processed for knowledge distillation while maintaining the security of the entire process. The decryption occurs entirely within the secure environment, ensuring that the processed results remain protected within the trusted boundary.

At 219, the decrypted response is processed via knowledge distillation. The distillation module 108 may perform this processing within the secure environment 101. This distillation step extracts valuable knowledge and patterns from the external LLM's response, enabling the local LLM to learn and improve its capabilities. The distillation step may include processing a 'chain of thoughts' provided in the response, enabling better training of the local model. Through this distillation process, the local model can improve its capabilities by learning from the external model's responses, potentially reducing the need for future external processing requests.

At 221, the distilled knowledge is transmitted to the local LLM and a response is generated. For example, the distillation module 108 transmits the processed knowledge to the local LLM 110, which then generates a response that is provided to the user module 102 through the local inference module 106. This final step completes the knowledge transfer process by providing the user with the requested response.

Figure 3:
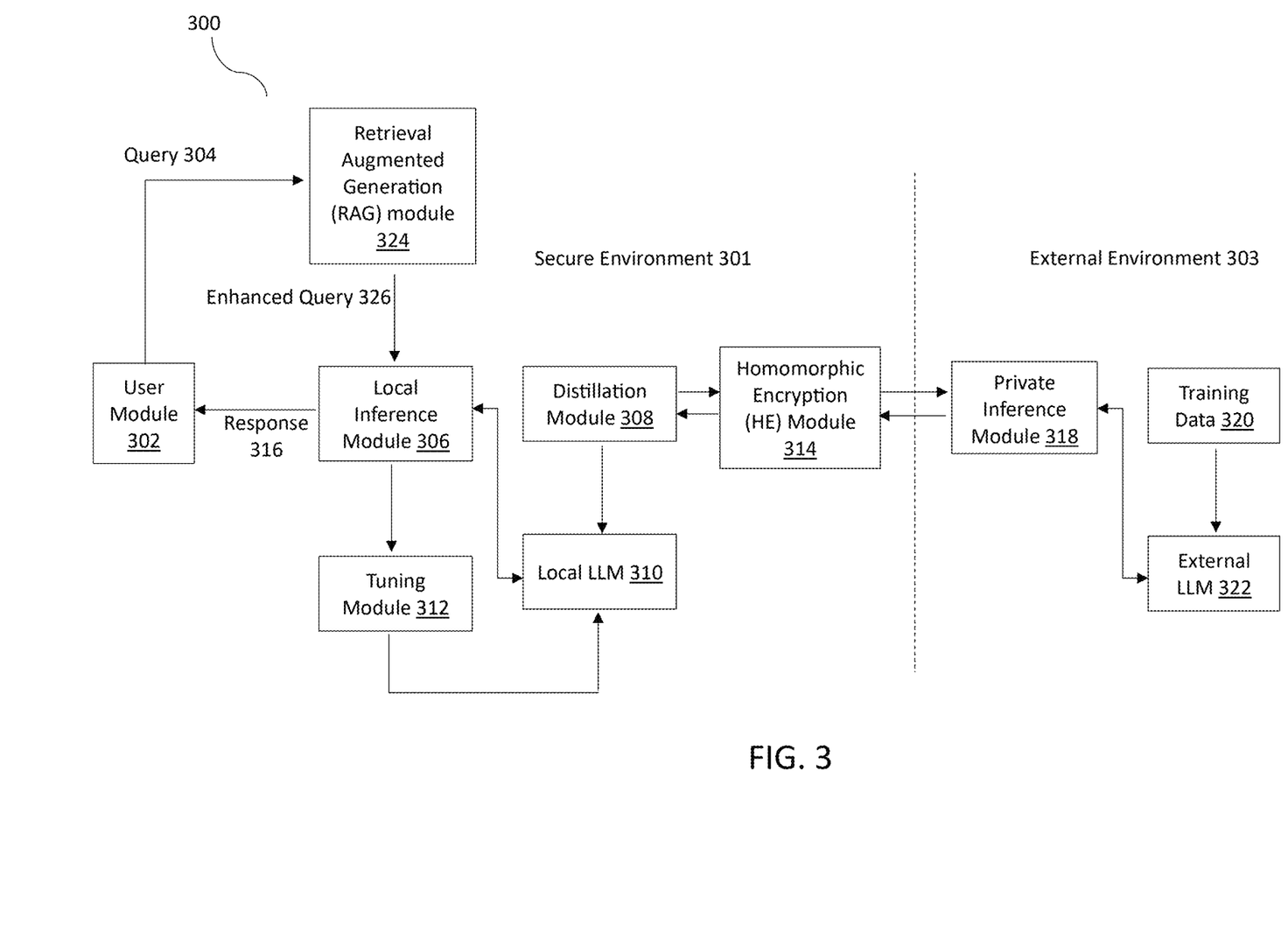
FIG. 3 is a block diagram showing a system architecture incorporating a local retrieval augmented generation (RAG) module in a secure environment for knowledge distillation, in accordance with an embodiment of the present disclosure.

FIG. 3 is a block diagram showing a system architecture 300 incorporating a local retrieval augmented generation (RAG) module in a secure environment for knowledge distillation, in accordance with an embodiment of the present disclosure. The system architecture 300 may include a secure environment 301 and an external environment 303, which may be separated by at least one security boundary that may be represented by a dotted line in the figure.

The secure environment 301 may include a user module 302 that is configured to provide an interface for user interactions with the system 300. The user module 302 may be configured to generate queries 304 based on received user input and process responses 316 to such queries. Additionally, the user module 302 is configured to maintain security parameters by operating within the secure environment 301, which ensures the protection of user interactions.

A retrieval augmented generation (RAG) module 324 is operatively connected to the user module 302 and is configured to receive and process the queries 304. The RAG module 324 is configured to enrich the queries with relevant data from the client or company's private database maintained within the secure environment 301. The RAG module 324 generates enhanced queries 326 by augmenting the original queries with contextual information, enabling more accurate and relevant responses from the system.

A local inference module 306 is operatively connected to the RAG module 324 and is configured to receive and process the enhanced queries 326. The local inference module 306 maintains bidirectional data flow with the local LLM 310, sending enhanced queries for processing and receiving inference results. The local inference module 306 is further configured to transmit processing results and performance metrics to the tuning module 312 for optimization.

The local LLM 310 may be provided within the secure environment 301 and is configured to process enhanced queries locally. The local LLM 310 maintains bidirectional communication with the local inference module 306, receiving enhanced queries and returning processing results. The local LLM 310 may receive knowledge transfer data from the distillation module 308 for model enhancement and receive optimization updates from the tuning module 312 based on local inference operations.

The secure environment 301 may include a distillation module 308 that is configured to generate external processing requests and perform knowledge distillation on returned data for the local LLM 310. The distillation module 308 supports the system's external processing capabilities when queries cannot be processed by the local LLM 310. The distillation module 308 is configured to maintain a bidirectional connection with the HE module 314 and facilitate knowledge transfer from the external environment 303 to the local LLM 310.

The homomorphic encryption (HE) module 314 may be provided within the secure environment 301 and maintains bidirectional connections with the distillation module 308 and the private inference module 318. The HE module 314 may be configured to enable secure data transmission between environments using one or more homomorphic encryption schemes. For outbound operations, the HE module 314 receives data from the distillation module 308, which may include elements from the enhanced queries, encrypts this data using the selected homomorphic encryption scheme, and transmits the encrypted data to the private inference module 318 in the external environment 303. For inbound operations, the HE module 314 receives encrypted data from the private inference module 318, decrypts this data, and transmits the decrypted data to the distillation module 308.

The system 300 may further include a tuning module 312 within the secure environment 301 that may be configured to optimize the performance of the local LLM 310. The tuning module 312 receives processing results and performance metrics from the local inference module 306 and provides optimization updates to the local LLM 310. The tuning module 312 may adapt its optimization strategies based on the enhanced queries provided by the RAG module 324, enabling more targeted performance improvements.

In the external environment 303, the private inference module 318 maintains bidirectional communication with the HE module 314 and the external LLM 322. For outbound processing, the private inference module 318 receives encrypted data from the HE module 314 and coordinates with the external LLM 322 to process this data. For inbound operations, the private inference module 318 receives processing results from the external LLM 322 and transmits encrypted data back to the HE module 314. The private inference module 318 operates entirely on encrypted data, enabling computation without access to the underlying plaintext information from the secure environment 301.

External training data 320 includes information to support the processing operations of the external LLM 322. For example, this may include training examples, reference data, optimization parameters, or combinations thereof that enable the external LLM 322 to process requests received through the private inference module 318.

The external LLM 322 is operatively connected to the private inference module 318 and is configured to receive encrypted inference requests from and transmit encrypted inference results to the private inference module 318. The external LLM 322 may utilize the information from the training data 320 to support its processing operations while maintaining the encrypted state of communications with the private inference module 318.

In operation, the RAG module 324 enhances the system's capabilities by incorporating relevant private database information into queries before they are processed by either the local LLM 310 or, when required, the external LLM 322. This enhancement enables more accurate and contextually relevant responses while maintaining data privacy.

Figure 4:
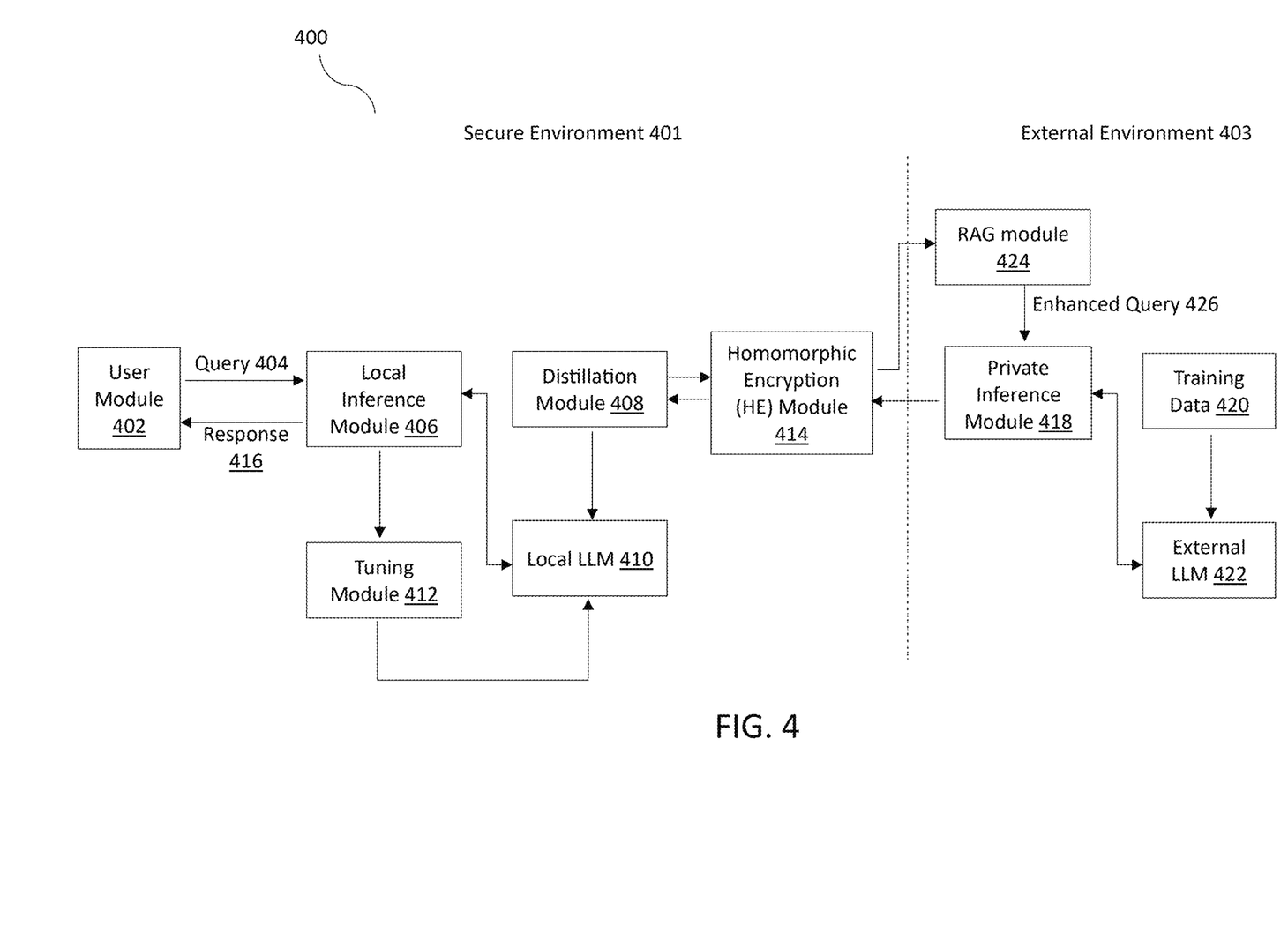
FIG. 4 is a block diagram showing a system architecture incorporating an external retrieval augmented generation (RAG) module in an external environment, in accordance with yet another embodiment of the present disclosure.

FIG. 4 4 is a block diagram showing a system architecture 400 incorporating an external retrieval augmented generation (RAG) module in an external environment, in accordance with yet another embodiment of the present disclosure. The system architecture 400 may include a secure environment 401 and an external environment 403, which may be separated by at least one security boundary that may be represented by a dotted line in the figure.

The secure environment 401 may include a user module 402 that is configured to provide an interface for user interactions with the system 400. The user module 402 may be configured to generate queries 404 based on received user input and process responses 416 to such queries. Additionally, the user module 402 is configured to maintain security parameters by operating within the secure environment 401, which ensures the protection of user interactions.

A local inference module 406 is operatively connected to the user module 402 and is configured to receive and process queries 404. The local inference module 406 maintains bidirectional data flow with the local LLM 410, sending queries for processing and receiving inference results. The local inference module 406 is further configured to transmit processing results and performance metrics to the tuning module 412 for optimization.

The local LLM 410 may be provided within the secure environment 401 and is configured to process queries locally. The local LLM 410 maintains bidirectional communication with the local inference module 406, receiving queries and returning processing results. The local LLM 410 may receive knowledge transfer data from the distillation module 408 for model enhancement and receive optimization updates from the tuning module 412 based on local inference operations.

The secure environment 401 may include a distillation module 408 that is configured to generate external processing requests and perform knowledge distillation on returned data for the local LLM 410. The distillation module 408 supports the system's external processing capabilities when queries cannot be processed by the local LLM 410. The distillation module 408 is configured to maintain a bidirectional connection with the HE module 414 and facilitate knowledge transfer from the external environment 403 to the local LLM 410.

The homomorphic encryption (HE) module 414 may be provided within the secure environment 401 and maintains bidirectional connections with the distillation module 408 and the private inference module 418. The HE module 414 may be configured to enable secure data transmission between environments using one or more homomorphic encryption schemes. For outbound operations, the HE module 414 receives data from the distillation module 408, encrypts this data using the selected homomorphic encryption scheme, and transmits the encrypted data to the private inference module 418 in the external environment 403. For inbound operations, the HE module 414 receives encrypted data from the private inference module 418, decrypts this data, and transmits the decrypted data to the distillation module 408.

The system 400 may include a tuning module 412 within the secure environment 401 that may be configured to optimize the performance of the local LLM 410. The tuning module 412 receives processing results and performance metrics from the local inference module 406 and provides optimization updates to the local LLM 410.

In the external environment 403, a RAG module 424 is operatively connected to the private inference module 418. The RAG module 424 is configured to receive encrypted queries from the private inference module 418 and augment them with relevant information from external databases. The RAG module 424 generates enhanced queries 426 by incorporating additional context while maintaining the encrypted state of the data. This enhancement process occurs entirely within the external environment 403, enabling the system to leverage external knowledge bases while preserving the security of the original queries through homomorphic encryption.

The private inference module 418 maintains bidirectional communication with the HE module 414, the RAG module 424, and the external LLM 422. The private inference module 418 receives encrypted data from the HE module 414, coordinates query enhancement with the RAG module 424, and manages processing with the external LLM 422. All operations within the private inference module 418 maintain the encrypted state of the data, enabling computation without access to the underlying plaintext information.

External training data 420 includes information to support the processing operations of the external LLM 422. For example, this may include training examples, reference data, optimization parameters, or combinations thereof that enable the external LLM 422 to process the enhanced encrypted queries received through the private inference module 418.

The external LLM 422 is operatively connected to the private inference module 418 and is configured to receive encrypted enhanced queries and transmit encrypted inference results. The external LLM 422 may utilize the information from the training data 420 to support its processing operations while maintaining the encrypted state of all communications.

In operation, the embodiment of FIG. 4 enables the system to leverage external databases for query enhancement through the RAG module 424 while maintaining data privacy through homomorphic encryption. The encrypted queries can be enhanced with additional context before being processed by the external LLM 422, enabling more accurate and comprehensive responses.

Figure 5:
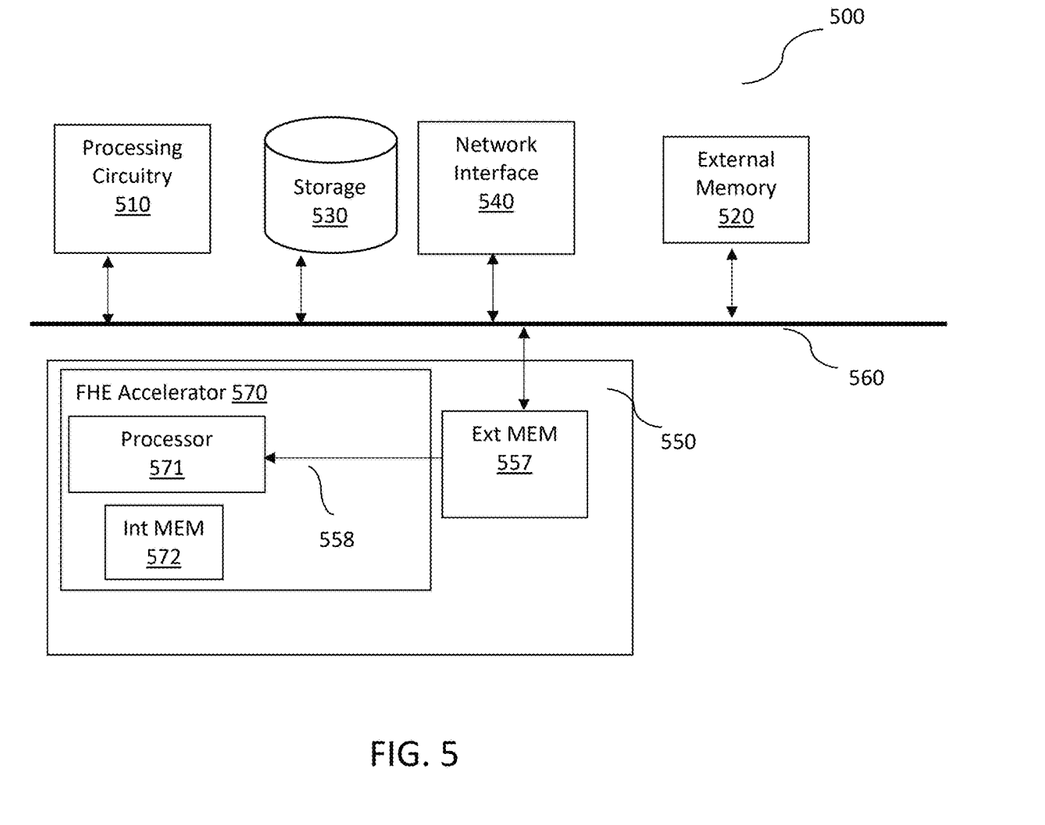
FIG. 5 is a block diagram showing a server incorporating a fully homomorphic encryption (FHE) accelerator, in accordance with various embodiments of the present disclosure.

FIG. 5 is a block diagram showing a server 500 incorporating a fully homomorphic encryption (FHE) accelerator 570, in accordance with various embodiments of the present disclosure. The server 500 includes a processing circuitry 510 coupled to a memory 520, a storage 530, a network interface 540, and an FHE card 550. In one embodiment, the components of server 500 may be communicatively connected via bus 560.

The processing circuitry 510 may be realized as one or more hardware logic components and circuits. For example, and without limitation, illustrative types of hardware logic components that can be used include field-programmable gate arrays (FPGAs), application-specific integrated circuits (ASICs), application-specific standard products (ASSPs), system-on-a-chip (SoC) systems, graphics processing units (GPUs), tensor processing units (TPUs), general-purpose microprocessors, microcontrollers, digital signal processors (DSPs), and the like, or any other hardware logic components capable of performing calculations or other manipulations of information.

External Memory 520 may be volatile (e.g., random access memory), non-volatile (e.g., read-only memory, flash memory), or a combination thereof, and serves as the main system memory for server 500. This is distinct from the external memory 557 on the FHE card 550, which is specifically dedicated to supporting FHE operations. Storage 530 may include non-volatile memory devices, magnetic disk drives, optical disk drives, tape drives, and similar devices. Examples of memory 520 may include EEPROM, ROM, PROM, RAM, DRAM, SRAM, flash memory, firmware, programmable logic, and so on. Storage 530 may comprise internal storage, attached storage, and/or network-accessible storage. The network interface 540 allows server 500 to communicate with external systems, utilizing various communication protocols.

Memory 520 and/or storage 530 may store software required to execute homomorphic encryption operations for secure knowledge distillation. The bus 560 may include, for example, a PCIe bus.

Software should be construed broadly to include any type of instructions, whether referred to as software, firmware, middleware, microcode, hardware description language, or otherwise. Instructions may include code in various formats, such as source code, binary code, executable code, or any other suitable format.

FHE card 550 is configured to rapidly perform complex homomorphic operations. The FHE card 550 can be installed in server 500 or operate as a standalone device. The FHE card 550 includes an FHE accelerator 570.

The FHE accelerator 570 includes a processor 571 and an internal memory 572, or multiple processors with internal memory, designed to accelerate homomorphic encryption operations required for secure knowledge distillation. Processor 571 may include multiple cores capable of managing multiple computation threads simultaneously. Internal memory 572 is dedicated to storing data for executing homomorphic encryption operations, including encrypted model data and intermediate results during the distillation process. Internal memory 572 is designed for high bandwidth, enabling quick access to stored data. It is realized as on-die memory.

In one embodiment, the FHE accelerator 570 can be realized as an ASIC. In other embodiments, the FHE accelerator 570 can be realized as an FPGA, ASSP, SoC, or other hardware logic components capable of performing calculations or other manipulations of information.

The FHE card 550 also includes external memory 557 and a memory bus 558. Memory bus 558 can be configured as a dedicated high-speed interface through which processor 571 communicates with external memory 557, enabling efficient data transfer during homomorphic encryption operations. Typically, external memory 557 is an SDRAM, high-bandwidth SDRAM (e.g., GDDR5, GDDR6), or high-bandwidth memory (HBM).

The FHE card 550 connects to the server's main components through bus 560 via a dedicated interface. This interface, typically implemented as PCIe, enables high-speed communication between the FHE card 550 and other server components, such as processing circuitry 510 and external memory 520.

The FHE accelerator 570 is particularly suited for the computational demands of secure knowledge distillation, supporting both real-time and offline processing modes. During real-time processing, the accelerator enables efficient encryption and processing of queries, while in offline mode, it facilitates encrypted model distillation operations with optimized resource utilization. The accelerator's architecture supports the processing requirements of both local and cloud-based deployments, including scenarios involving retrieval augmented generation (RAG).

It should be understood that the embodiments described herein are not limited to the specific architecture illustrated in FIG. 5, and other architectures may be used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform with hardware such as one or more central processing units ("CPUs"), memory, and input/output interfaces. The computer platform may also include an operating system and microinstruction code. The various processes and functions described herein may be either part of the microinstruction code or part of the application program or any combination thereof, which may be executed by a CPU, whether or not such a computer or processor is explicitly shown. In addition, various other peripheral units may be connected to the computer platform, such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to further the art and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to the first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for secure knowledge transfer between machine learning models, comprising:
   determining whether a local language model within a secure environment is capable of processing an input query based on one or more criteria;
   generating a response using the local language model when the local language model is determined to be capable of processing the query;
   generating an external processing request when the local language model is determined to be not capable of processing the query;
   encrypting the external processing request using a homomorphic encryption technique;
   transmitting the encrypted external processing request to an external environment;
   receiving an encrypted response from the external environment;
   decrypting the encrypted response within the secure environment to generate a decrypted response;
   performing knowledge distillation on the decrypted response to extract knowledge patterns, wherein performing the knowledge distillation includes extracting, within the secure environment, at least one chain-of-thought reasoning pattern from the decrypted response; and
   updating the local language model using the extracted knowledge patterns.

2. The method of claim 1, further comprising:
   generating training data for the local language model based on the extracted knowledge patterns.

3. The method of claim 1, wherein updating the local language model further comprises:
   incorporating the distilled knowledge into the local language model's parameters; and validating the local language model's performance.

4. The method of claim 1, wherein the one or more criteria includes at least one of the local language model's knowledge base, training parameters, and domain-specific capabilities.

5. The method of claim 1, wherein performing the knowledge distillation comprises extracting at least one of: response templates, domain-specific knowledge, optimization parameters, and model weights.

6. The method of claim 1, wherein the external processing request includes at least one of an immediate query processing request, a domain knowledge request, a training data request, an optimization parameter request, and validation data request.

7. The method of claim 1, further comprising:
   receiving processing results from a local inference module;
   implementing optimization algorithms to enhance model performance of the local language model; and
   maintaining efficiency parameters of the local language model based on the received processing results.

8. The method of claim 1, further comprising:
   augmenting the query with information from a private database within the secure environment using a retrieval augmented generation (RAG) module to generate an enhanced query; and
   processing the enhanced query using the local language model.

9. The method of claim 1, wherein the homomorphic encryption comprises at least one of: partially homomorphic encryption (PHE); somewhat homomorphic encryption (SHE); and fully homomorphic encryption (FHE).

10. The method of claim 1, further comprising:
    optimizing cloud computing resources by: performing offline distillation; and minimizing data transmitted from the secure environment to the external environment over time.

11. The method of claim 1, further comprising:
    maintaining a security boundary between the secure environment and the external environment; and
    ensuring data crossing the security boundary is encrypted using homomorphic encryption.

12. The method of claim 1, wherein the external processing request is processed using a hardware accelerator optimized for homomorphic encryption operations.

13. The method of claim 1, further comprising:
    performing offline knowledge distillation; and
    configuring the local language model based on the offline knowledge distillation.

14. A system for secure knowledge transfer between machine learning models comprising:
    at least one processing circuitry operatively coupled to a non-transitory memory, the at least one processing circuitry configured to:
    receive a query within a secure environment;
    determine whether a local language model within the secure environment is capable of processing the query based on one or more criteria;
    generate a response using the local language model when the local language model is determined to be capable of processing the query;
    generate an external processing request when the local language model is determined to be not capable of processing the query;
    encrypt the external processing request using homomorphic encryption;
    transmit the encrypted external processing request to an external environment;
    receive an encrypted response from the external environment;
    decrypt the encrypted response within the secure environment to generate a decrypted response;
    perform knowledge distillation on the decrypted response to extract knowledge patterns, wherein performing the knowledge distillation includes extracting, within the secure environment, at least one chain-of-thought reasoning pattern from the decrypted response; and
    update the local language model using the extracted knowledge patterns.

15. The system of claim 14, further comprising: a homomorphic encryption accelerator configured to perform encryption operations; and wherein the homomorphic encryption accelerator comprises dedicated processing circuitry optimized for homomorphic encryption calculations.

16. The system of claim 14, wherein the external environment comprises: a private inference module configured to process encrypted requests; an external language model configured to generate responses; and training data accessible to the external language model.

17. The system of claim 14, further comprising: a retrieval augmented generation (RAG) module configured to enhance queries with information from a private database.

18. A non-transitory computer-readable medium storing a set of instructions for secure knowledge transfer between machine learning models, the set of instructions comprising:
one or more instructions that, when executed by one or more processors of a device, cause the device to:
receive a query within a secure environment;
determine whether a local language model within the secure environment is capable of processing the query based on one or more criteria;
generate a response using the local language model when the local language model is determined to be capable of processing the query;
generate an external processing request when the local language model is determined to be not capable of processing the query;
encrypt the external processing request using homomorphic encryption;
transmit the encrypted external processing request to an external environment;
receive an encrypted response from the external environment;
decrypt the encrypted response within the secure environment to generate a decrypted response;
perform knowledge distillation on the decrypted response to extract knowledge patterns, wherein performing the knowledge distillation includes extracting, within the secure environment, at least one chain-of-thought reasoning pattern from the decrypted response; and
update the local language model using the extracted knowledge patterns.

19. The non-transitory computer-readable medium of claim 18, wherein the one or more instructions further cause the device to: enrich the query with data from a cloud-based database using a retrieval augmented generation (RAG) mechanism; and process the enriched query while maintaining the data in an encrypted state.

20. The non-transitory computer-readable medium of claim 18, wherein the one or more instructions further cause the device to: process the encrypted request during a real-time inference operation; and perform knowledge distillation during an offline training session.

21. The non-transitory computer-readable medium of claim 18, wherein processing the decrypted response comprises: extracting domain-specific knowledge from the external environment; and customizing the local language model using the extracted domain-specific knowledge.

22. The non-transitory computer-readable medium of claim 18, wherein the one or more instructions further cause the device to: initialize the local language model with initial learning parameters; and update the local language model using continues distillation during regular operational use.

23. The non-transitory computer-readable medium of claim 18, wherein extracting the at least one chain-of-thought reasoning pattern enhances training of the local language model.

* * * * *